US012629886B2

(12) United States Patent
Discekici et al.

(10) Patent No.: US 12,629,886 B2
(45) Date of Patent: May 19, 2026

(54) THREE-DIMENSIONAL PRINTING WITH DIHYDRAZIDE ANTIOXIDANTS

(71) Applicant: PERIDOT PRINT LLC, Palo Alto, CA (US)

(72) Inventors: Emre Hiro Discekici, San Diego, CA (US); Shannon Reuben Woodruff, San Diego, CA (US); Jesiska Tandy, San Diego, CA (US); Carolin Fleischmann, San Diego, CA (US)

(73) Assignee: Peridot Print LLC, Palo Alto, CA (US)

( * ) Notice: Subject to any disclaimer, the term of this patent is extended or adjusted under 35 U.S.C. 154(b) by 465 days.

(21) Appl. No.: 17/294,126

(22) PCT Filed: Jun. 10, 2019

(86) PCT No.: PCT/IB2019/001327
§ 371 (c)(1),
(2) Date: May 14, 2021

(87) PCT Pub. No.: WO2020/249999
PCT Pub. Date: Dec. 17, 2020

(65) Prior Publication Data
US 2024/0375349 A1 Nov. 14, 2024

(51) Int. Cl.
*B29C 64/165* (2017.01)
*B29K 77/00* (2006.01)
(Continued)

(52) U.S. Cl.
CPC ............ *B29C 64/165* (2017.08); *B33Y 70/10* (2020.01); *C08K 3/22* (2013.01); *C08K 5/25* (2013.01);
(Continued)

(58) Field of Classification Search
None
See application file for complete search history.

(56) References Cited

U.S. PATENT DOCUMENTS

| | | | |
|---|---|---|---|
| 2,724,706 A | 11/1955 | Bersworth | |
| 3,284,234 A | 11/1966 | Hervey et al. | |
| (Continued) | | | |

FOREIGN PATENT DOCUMENTS

| | | |
|---|---|---|
| CN | 101134841 A | 3/2008 |
| CN | 101875745 A | 11/2010 |
| (Continued) | | |

OTHER PUBLICATIONS

Machine translation of JP-2005023027-A (Kujira et al., 2005).
(Continued)

*Primary Examiner* — Joseph D Anthony
(74) *Attorney, Agent, or Firm* — Dierker & Kavanaugh, P.C.

(57) ABSTRACT

The present disclosure describes multi-fluid kits for three-dimensional printing, three-dimensional printing kits, and methods of making three-dimensional printed articles. In one example, a multi-fluid kit for three-dimensional printing can include a fusing agent and a second fluid agent. The fusing agent can include water and a radiation absorber. The radiation absorber can absorb radiation energy and convert the radiation energy to heat. The fusing agent or the second fluid agent can include a water-soluble or water-dispersible dihydrazide antioxidant.

11 Claims, 4 Drawing Sheets

100

110

120

(51) Int. Cl.
 _B33Y 70/10_ (2020.01)
 _C08K 3/22_ (2006.01)
 _C08K 5/25_ (2006.01)
 _C08L 77/02_ (2006.01)
 _B33Y 10/00_ (2015.01)
 _B33Y 70/00_ (2020.01)

(52) U.S. Cl.
 CPC .......... _C08L 77/02_ (2013.01); _B29K 2077/00_
 (2013.01); _B33Y 10/00_ (2014.12); _B33Y 70/00_
 (2014.12)

(56) References Cited

U.S. PATENT DOCUMENTS

| | | | |
|---|---|---|---|
| 3,660,438 A | 5/1972 | Dexter | |
| 3,826,752 A | 7/1974 | Rody et al. | |
| 4,012,360 A | 3/1977 | Schwarzenbach et al. | |
| 4,147,689 A | 4/1979 | Thompson et al. | |
| 4,447,571 A | 5/1984 | Dabi et al. | |
| 4,801,749 A | 1/1989 | Kazmierczak et al. | |
| 5,216,078 A | 6/1993 | Cook et al. | |
| 6,811,597 B2 | 11/2004 | Oki et al. | |
| 10,030,154 B2 | 7/2018 | Naruse et al. | |
| 12,227,659 B2 * | 2/2025 | Discekici | C09D 11/324 |
| 12,280,543 B2 * | 4/2025 | Discekici | B29C 64/165 |
| 2006/0052260 A1 | 3/2006 | Duyck et al. | |
| 2010/0212930 A1 | 8/2010 | Yasumoto et al. | |
| 2011/0224074 A1 | 9/2011 | Okada et al. | |
| 2016/0272817 A1 | 9/2016 | Naruse et al. | |
| 2018/0022923 A1 | 1/2018 | Emamjomeh et al. | |
| 2018/0119017 A1 | 5/2018 | Schlosser et al. | |
| 2018/0272607 A1 | 9/2018 | Chaffins et al. | |
| 2019/0036414 A1 | 1/2019 | Ludois et al. | |
| 2019/0061236 A1 | 2/2019 | Rantala et al. | |
| 2020/0016827 A1 | 1/2020 | Yamashita et al. | |
| 2021/0354196 A1 * | 11/2021 | Chen | B33Y 70/10 |
| 2022/0049120 A1 * | 2/2022 | Woodruff | C08K 5/405 |
| 2022/0056284 A1 * | 2/2022 | Discekici | C09D 7/63 |
| 2022/0088858 A1 * | 3/2022 | Woodruff | B29C 64/165 |
| 2022/0089892 A1 * | 3/2022 | Discekici | B33Y 70/00 |
| 2022/0119622 A1 * | 4/2022 | Discekici | B29C 64/165 |
| 2024/0059009 A1 * | 2/2024 | Discekici | B33Y 70/10 |
| 2025/0206973 A1 * | 6/2025 | Discekici | C08J 9/10 |

FOREIGN PATENT DOCUMENTS

| | | |
|---|---|---|
| CN | 102226799 A | 10/2011 |
| CN | 103242729 A | 8/2013 |
| CN | 103556459 A | 2/2014 |
| CN | 103819647 A | 5/2014 |
| CN | 104628933 A | 5/2015 |
| CN | 104736639 A | 6/2015 |
| CN | 105648793 A | 6/2016 |
| CN | 105295354 B | 10/2017 |
| CN | 107915940 A | 4/2018 |
| CN | 109789633 A | 5/2019 |
| JP | S51-068650 A | 6/1976 |
| JP | 10-168423 A | 6/1998 |
| JP | 2005-023027 A | 1/2005 |
| JP | 2018158571 A | 10/2018 |
| KR | 10-2015-0112390 A | 10/2015 |
| WO | 2004076419 A1 | 9/2004 |
| WO | WO-2009000660 A2 | 12/2008 |
| WO | 2017/018985 A1 | 2/2017 |
| WO | 2017/069752 A1 | 4/2017 |
| WO | 2018003512 A1 | 1/2018 |
| WO | 2018173755 A1 | 9/2018 |
| WO | 2019/078855 A1 | 4/2019 |
| WO | 2019108201 A1 | 6/2019 |
| WO | 2019/182627 A1 | 9/2019 |

OTHER PUBLICATIONS

Tayca Corporation, Titanium dioxide data sheet, 2009.
Machine translation of CN-103242729-A (Wang, 2013).
National Institute of Advanced Industrial Science and Technology (AIST), SDBS-2625, SDBS AIST Database, 1999.
He, et al., Thermal stability and yellowing of polyamide finished with a compound anti-thermal-yellowing agent, The Journal of The Textile Institute, vol. 106, 2015—Issue 12, 3 pages.

* cited by examiner

100

200

300

400

| | | |
|---|---|---|
| 440 | 410 | 430 |

500

| | | | |
|---|---|---|---|
| 540 | 510 | 520 | 530 |

THREE-DIMENSIONAL PRINTING WITH DIHYDRAZIDE ANTIOXIDANTS

BACKGROUND

Methods of three-dimensional (3D) digital printing, a type of additive manufacturing, have continued to be developed over the last few decades. However, systems for 3D printing have historically been very expensive, though those expenses have been coming down to more affordable levels recently. In general, 3D printing technology can shorten the product development cycle by allowing rapid creation of prototype models for reviewing and testing. Unfortunately, the concept has been somewhat limited with respect to commercial production capabilities because the range of materials used in 3D printing is likewise limited. Accordingly, it can be difficult to 3D print functional parts with desired properties such as mechanical strength, visual appearance, and so on. Nevertheless, several commercial sectors such as aviation and the medical industry have benefitted from the ability to rapidly prototype and customize parts for customers.

Figure 1:
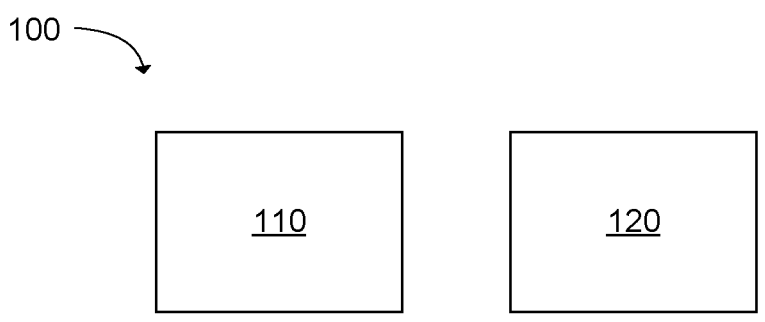
FIG. 1 is a schematic view of an example multi-fluid kit for three-dimensional printing in accordance with examples of the present disclosure.

The figures depict several examples of the presently disclosed technology. However, it should be understood that the present technology is not limited to the examples depicted.

DETAILED DESCRIPTION

The present disclosure describes multi-fluid kits for three-dimensional printing, three-dimensional printing kits, and methods of making three-dimensional printed articles. In one example, a multi-fluid kit for three-dimensional printing can include a fusing agent and a second fluid agent. The fusing agent can include water and a radiation absorber, wherein the radiation absorber absorbs radiation energy and converts the radiation energy to heat. The fusing agent or the second fluid agent can include a water-soluble or water-dispersible dihydrazide antioxidant. In a certain example, the second fluid can be a detailing agent including a detailing compound, wherein the detailing compound reduces a temperature of powder bed material onto which the detailing agent is applied. In another example, the second fluid agent can be an antioxidant agent including water and the dihydrazide. In some examples, the dihydrazide can be present in the fusing agent or the second fluid agent in an amount from about 0.1 wt % to about 10 wt % with respect to a total weight of the fusing agent or the second fluid agent, respectively. In further examples, the dihydrazide can include adipic dihydrazide, carbohydrazide, oxalyl dihydrazide, succinic dihydrazide, isophthalic dihydrazide, azelaic dihydrazide, sebacic dihydrazide, dodecanedioic dihydrazide, terephthalic dihydrazide, oxybisbenzene sulfonylhydrazide, or a combination thereof. In still further examples, the radiation absorber can be a metal dithiolene complex, carbon black, a near-infrared absorbing dye, a near-infrared absorbing pigment, metal nanoparticles, a conjugated polymer, or a combination thereof. In certain examples, the fusing agent can be colorless.

The present disclosure also describes three-dimensional printing kits. In one example, a three-dimensional printing kit can include a powder bed material including polymer particles and an antioxidant agent to selectively apply to the powder bed material. The antioxidant agent can include water and a water soluble or dispersible dihydrazide. In a particular example, the antioxidant agent can also be a fusing agent that further includes a radiation absorber that absorbs radiation energy and converts the radiation energy to heat such that the antioxidant agent functions as a fusing agent. In another example, the three-dimensional printing kit can also include a fusing agent, separate from the antioxidant agent, to selectively apply to the powder bed material. The fusing agent can include water and a radiation absorber, wherein the radiation absorber absorbs radiation energy and converts the radiation energy to heat. In some examples, the polymer particles include polyamide 6, polyamide 9, polyamide 11, polyamide 12, polyamide 6/6, polyamide 6/12, polyethylene, thermoplastic polyurethane, polypropylene, polyester, polycarbonate, polyether ketone, polyacrylate, polystyrene powder, wax, or a combination thereof. In further examples, the dihydrazide can include adipic dihydrazide, carbohydrazide, oxalyl dihydrazide, succinic dihydrazide, isophthalic dihydrazide, azelaic dihydrazide, sebacic dihydrazide, dodecanedioic dihydrazide, terephthalic dihydrazide, oxybisbenzene sulfonylhydrazide, or a combination thereof.

The present disclosure also describes methods of making three-dimensional printed articles. In one example, a method of making a three-dimensional article can include iteratively applying individual build material layers of polymer particles to a powder bed. A fusing agent can be selectively jetted onto the individual build material layers based on a three-dimensional object model. The fusing agent can include water and a radiation absorber. A water soluble or dispersible dihydrazide can also be jetted onto the individual build material layers based on the three-dimensional object model. The dihydrazide can be included in the fusing agent or in a separate antioxidant agent, or both. The powder bed can be exposed to energy to selectively fuse the polymer particles in contact with the radiation absorber to form a fused polymer matrix at individual build material layers. The polymer particles in contact with the dihydrazide can exhibit reduced yellowing compared to polymer particles not in contact with the dihydrazide. In a certain example, the dihydrazide can be included in separate antioxidant agent, and the antioxidant agent can also include a detailing compound that reduces a temperature of powder bed material onto which the antioxidant agent is applied. In another example, the dihydrazide can be selectively jetted on areas of the individual build material that form an exterior surface of the three-dimensional printed article, remain as loose polymer particles adjacent to a surface of the three-dimensional printed article, or both.

The multi-fluid kits, three-dimensional printing kits, and methods described herein can be used to make three-dimensional printed articles with reduced yellowing due to oxidation. Certain three-dimensional (3D) printing processes can involve fusing layers of polymer powder to form solid layers of a 3D printed article. In one process, a fusing agent can be jetted onto a powder bed of polymer particles. The fusing agent can include a radiation absorber, which can be a material that absorbs radiant energy and converts the energy to heat. Radiant energy can be applied to the powder bed to heat and fuse the polymer particles on which the fusing agent was applied. This process can involve intense and repeated heating, which can cause oxidation of the polymer particles. The oxidation can cause yellowing, browning, or other degradation of the polymer. This degradation can be undesirable in the 3D printed article itself and in the powder in the powder bed surrounding the 3D printed part. In some cases, the loose powder in the powder bed can be recycled for use in printing another 3D printed article. If the powder is degraded, then the degradation can affect subsequent printing and can be compounded by further degradation of the powder during subsequent printing.

The kits and methods described herein can include a water-soluble or dispersible antioxidant that can be incorporated in a fluid agent used during 3D printing. Because the antioxidant can be in a fluid agent, the antioxidant can be selectively applied to the powder bed material during 3D printing. Therefore, in some cases the amount of antioxidant applied can be specifically tailored to the amount of oxidation expected in various parts of the powder. In other examples, the antioxidant can be applied to selectively reduce yellowing in certain portions of the 3D printed article, such as reducing yellowing at visible surfaces of the 3D printed article while allowing the interior to be yellowed. The application of the antioxidant to the powder bed can also be specifically tailored to various different powder bed materials. Different polymers may be susceptible to different levels of oxidation and degradation. Even powder bed materials having the same type of polymer particles may differ one from another because various different additives may be included in the powder bed materials. Additives such as antioxidants, flow aids, fillers, anti-static agents, and others can be included in powder bed materials. The identity and amount of these materials may not be known to the end user. In some cases, fluid agents used in the 3D printing process can also interact with the powder bed material to increase oxidation of the powder. Accordingly, it can be useful to have the fluid agents containing an antioxidant as described herein to allow for customized application of antioxidants to various different powder bed materials that may have different oxidation tendencies. The antioxidant fluid agents can reduce dependence of the 3D printing process on the state of the powder bed material when received from a supplier (i.e., with any unknown additives that may be present in the material). Thus, the fluid agents and methods described herein can be useful to provide customized antioxidant application for various purposes.

Although a variety of antioxidants exist, many antioxidant compounds are not suitable for use in jettable fluid agents. The fluid agents used in the 3D processes described herein can be jetted using fluid ejectors similar to inkjet printheads. The fluid agents can have certain properties to allow the fluid agents to be jettable by fluid ejector equipment. Many antioxidant compounds are too bulky and/or hydrophobic to be used in an aqueous jettable fluid agent. Some examples of antioxidants that have been included in polymer powder include copper salts, hindered and aromatic amines, hindered phenols, secondary antioxidants based on phosphites and thioester chemistries, and others. These additives may be included in dry powder, but may not be compatible with aqueous jettable fluid agents. However, the multi-fluid kits, three-dimensional printing kits, and methods described herein can include a water soluble or water dispersible dihydrazide antioxidant. These dihydrazides can be compatible with aqueous jettable fluid agents. Fluid agents containing these dihydrazide antioxidants can be jetted using the fluid ejector equipment used in some 3D printing processes.

Multi-Fluid Kits for Three-Dimensional Printing

With this description in mind, FIG. 1 shows a schematic of an example multi-fluid kit for three-dimensional printing 100. The kit includes a fusing agent 110 and a second fluid agent 120. The fusing agent can include water and a radiation absorber. The radiation absorber can absorb radiation energy and convert the radiation energy to heat. The fusing agent or the second fluid agent can include a water-soluble or water-dispersible dihydrazide antioxidant.

As used herein, "water-soluble" refers to materials that can be dissolved in water at a concentration from about 5 wt % to about 99 wt % of the dissolved material with respect to the entire weight of the solution. The solution of a water soluble material can be fully transparent without any phase separation. As used herein, "water-dispersible" refers to materials that can form a stable dispersion without settling in water at a concentration from about 5 wt % to about 99 wt % of the dispersed material with respect to the entire weight of the dispersion. The dispersible material can be dispersed either on its own or with a dispersant.

The water-soluble or water-dispersible dihydrazide antioxidant can generally be any compound that includes two hydrazide groups that can reduce oxidation of the powder bed materials described herein, and which can be dissolved or dispersed in an aqueous fluid. In some examples, the dihydrazide can include sulfonohydrazide groups, while in other examples, the dihydrazide can include carbohydrazide groups. Non-limiting examples of dihydrazide antioxidants can include adipic dihydrazide, carbohydrazide, oxalyl dihydrazide, succinic dihydrazide, isophthalic dihydrazide, azelaic dihydrazide, sebacic dihydrazide, dodecanedioic dihydrazide, terephthalic dihydrazide, oxybisbenzene sulfonylhydrazide, and combinations thereof.

As mentioned above, the dihydrazide antioxidant can be included in either the fusing agent or in the second fluid agent. In either case, the dihydrazide antioxidant can be selectively applied to a powder bed by jetting the fluid agent containing the dihydrazide antioxidant onto the powder bed. In certain examples, the dihydrazide antioxidant can be included in an amount from about 0.1 wt % to about 10 wt % in either the fusing agent or the second fluid agent. In further examples, the dihydrazide antioxidant can be included in an amount from about 1 wt % to about 6 wt % in either the fusing agent or the second fluid agent. In still further examples, the dihydrazide antioxidant can be included in both the fusing agent and the second fluid agent, in identical amounts or in different amounts.

In some examples, the second fluid agent can be a detailing agent. The detailing agent can include a detailing compound, which is a compound that can reduce the temperature of powder bed material onto which the detailing agent is applied. In some examples, the detailing agent can be applied around edges of the area where the fusing agent is applied. This can prevent powder bed material around the edges from caking due to heat from the area where the fusing agent was applied. The detailing agent can also be applied in the same area where fusing was applied in order to control the temperature and prevent excessively high temperatures when the powder bed material is fused. In some examples, the dihydrazide antioxidant can be included in the fusing agent, the detailing agent, or both.

Figure 2:
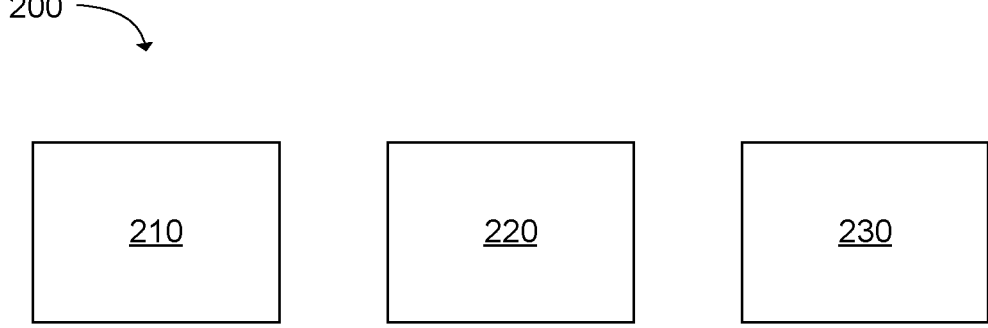
FIG. 2 is a schematic view of another example multi-fluid kit for three-dimensional printing in accordance with examples of the present disclosure.

In another example, the second fluid agent can be an antioxidant agent that includes water and the dihydrazide antioxidant. The multi-fluid kit can also include a separate detailing agent in addition to the antioxidant agent. The antioxidant agent may be selectively jetted in any areas where it is desired to reduce or prevent oxidation of the powder bed material. FIG. 2 shows a schematic of such a multi-fluid kit 200. This multi-fluid kit includes a fusing agent 210, an antioxidant agent 220, and a detailing agent 230.

Three-Dimensional Printing Kits

Figure 3:
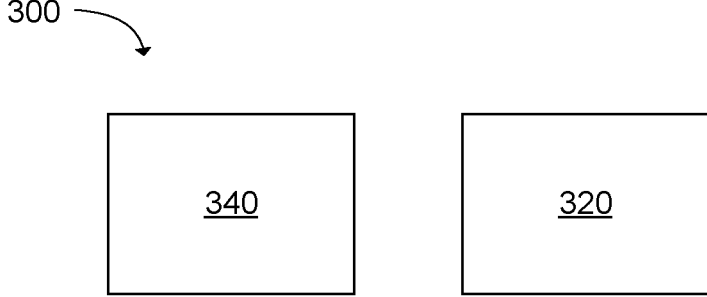
FIG. 3 is a schematic view an example three-dimensional printing kit in accordance with examples of the present disclosure.

The present disclosure also describes three-dimensional printing kits. In some examples, the three-dimensional printing kits can include materials that can be used in the three-dimensional printing processes described herein. FIG. 3 shows a schematic illustration of one example three-dimensional printing kit 300 in accordance with examples of the present disclosure. The kit includes a powder bed material 340 including polymer particles and an antioxidant agent 320 to selectively apply to the powder bed material. The antioxidant agent includes water and a water-soluble or water-dispersible dihydrazide.

Figures 4, 5:
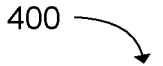
FIG. 4 is a schematic view of another example three-dimensional printing kit in accordance with examples of the present disclosure.
FIG. 5 is a schematic view of yet another example three-dimensional printing kit in accordance with examples of the present disclosure.

In further examples, a three-dimensional printing kit can include multiple fluid agents, such as any combination of a fusing agent, a detailing agent, and an antioxidant agent. FIG. 4 is a schematic illustration of one example three-dimensional printing kit 400 that includes a powder bed material 440, a fusing agent 410, and a detailing agent 430. The water-soluble or water-dispersible dihydrazide antioxidant can be included in the fusing agent or the detailing agent. Thus, either the fusing agent, detailing agent, or both can also be an antioxidant agent.

FIG. 5 is a schematic illustration of yet another example three-dimensional printing kit 500 that includes a powder bed material 540, a fusing agent 510, an antioxidant agent 520, and a detailing agent 530. In this example, the antioxidant agent can include water and the water-soluble or water-dispersible dihydrazide antioxidant. In certain examples, the fusing agent and/or the detailing agent can also include the dihydrazide antioxidant.

The dihydrazide antioxidant can be included in a fusing agent, antioxidant agent, or detailing agent, in an amount from about 0.1 wt % to about 10 wt % based on the total weight of the fluid agent. In further examples, the dihydrazide can be present in an amount from about 1 wt % to about 6 wt %.

Figure 6A:
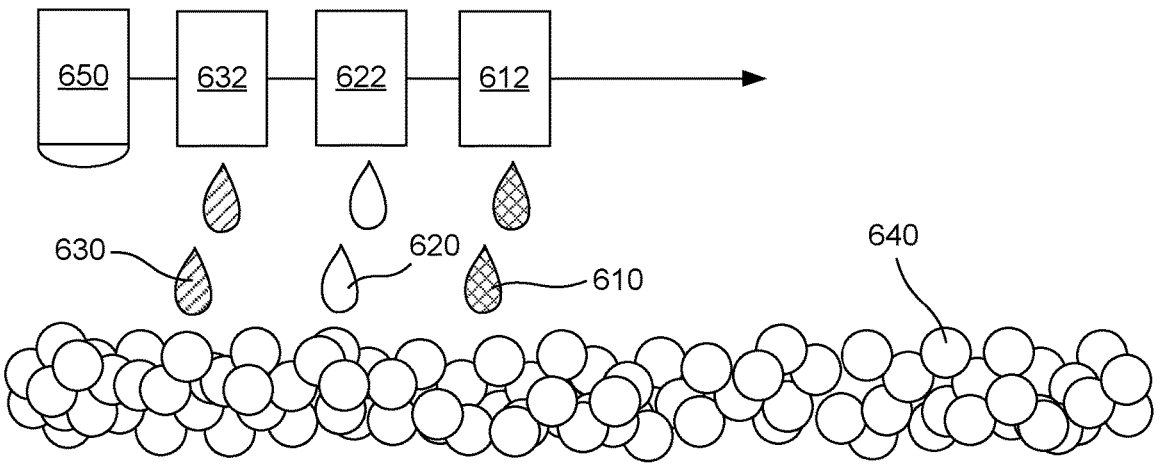
FIGS. 6A-6C show a schematic view of an example three-dimensional printing process using an example three-dimensional printing kit in accordance with examples of the present disclosure.
Figure 6B:
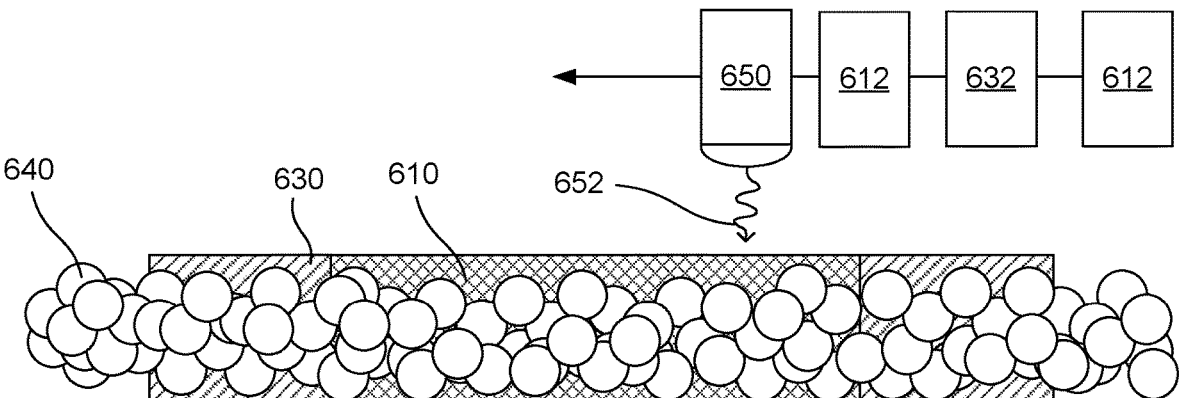
Figure 6C:
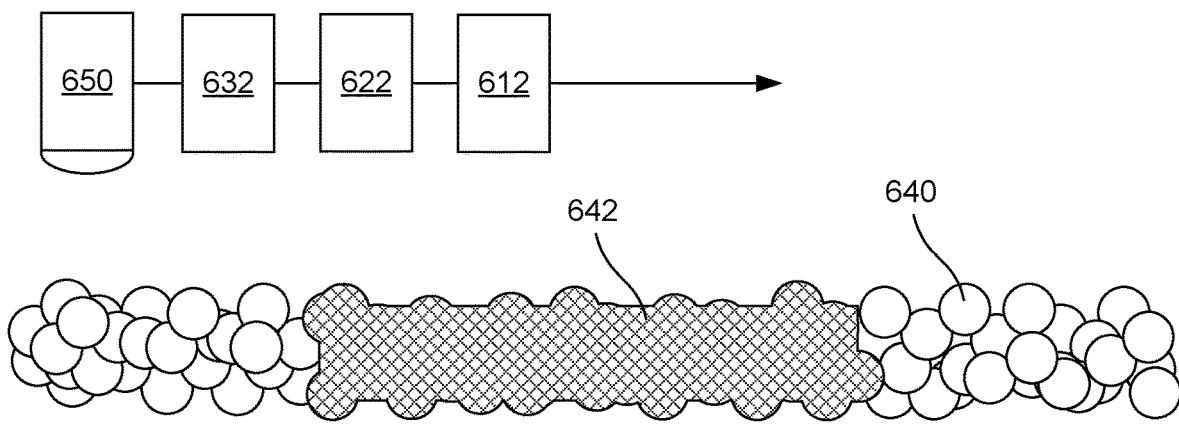

To illustrate the use of the three-dimensional printing kits and multi-fluid kits described herein, FIGS. 6A-6C illustrate one example of using a three-dimensional printing kit to form a 3D printed article. In FIG. 6A, a fusing agent 610, an antioxidant agent 620, and a detailing agent 630 are jetted onto a layer of powder bed material 640. The fusing agent is jetted from a fusing agent ejector 612, the antioxidant agent is jetted from an antioxidant agent ejector 622, and the detailing agent is jetted from a detailing agent ejector 632. These fluid ejectors can move across the layer of powder bed material to selectively jet fusing agent on areas that are to be fused, while the detailing agent can be jetted onto areas that are to be cooled. The antioxidant agent can be jetted in areas where reduced yellowing is desired. A dihydrazide antioxidant can be included in the antioxidant agent. In some examples, the dihydrazide antioxidant can also be included in the fusing agent and/or detailing agent. A radiation source 650 can also move across the layer of powder bed material.

FIG. 6B shows the layer of powder bed material 640 after the fusing agent 610 and the antioxidant agent 620 have been jetted onto an area of the layer that is to be fused. Additionally, the detailing agent 630 has been jetted onto areas adjacent to the edges of the area to be fused. In this figure, the radiation source 650 is shown emitting radiation 652 toward the layer of polymer particles. The fusing agent can include a radiation absorber that can absorb this radiation and convert the radiation energy to heat.

FIG. 6C shows the layer of powder bed material 640 with a fused portion 642 where the fusing agent was jetted. This portion has reached a sufficient temperature to fuse the polymer particles together to form a solid polymer matrix. The area where the detailing agent was jetted remains as loose polymer particles.

Powder Bed Materials

In certain examples, the powder bed material can include polymer particles having a variety of shapes, such as substantially spherical particles or irregularly-shaped particles. In some examples, the polymer powder can be capable of being formed into 3D printed objects with a resolution of about 20 µm to about 100 µm, about 30 µm to about 90 µm, or about 40 µm to about 80 µm. As used herein, "resolution" refers to the size of the smallest feature that can be formed on a 3D printed object. The polymer powder can form layers from about 20 µm to about 100 µm thick, allowing the fused layers of the printed part to have roughly the same thickness. This can provide a resolution in the z-axis (i.e., depth) direction of about 20 µm to about 100 µm. The polymer powder can also have a sufficiently small particle size and sufficiently regular particle shape to provide about 20 µm to about 100 µm resolution along the x-axis and y-axis (i.e., the axes parallel to the top surface of the powder bed). For example, the polymer powder can have an average particle size from about 20 µm to about 100 µm. In other examples, the average particle size can be from about 20 µm to about 50 µm. Other resolutions along these axes can be from about 30 µm to about 90 µm or from 40 µm to about 80 µm.

The polymer powder can have a melting or softening point from about 70° C. to about 350° C. In further examples, the polymer can have a melting or softening point from about 150° C. to about 200° C. A variety of thermoplastic polymers with melting points or softening points in these ranges can be used. For example, the polymer powder can be polyamide 6 powder, polyamide 9 powder, polyamide 11 powder, polyamide 12 powder, polyamide 6/6 powder, polyamide 6/12 powder, polyethylene powder, wax, thermoplastic polyurethane powder, acrylonitrile butadiene styrene powder, amorphous polyamide powder, polymethylmethacrylate powder, ethylene-vinyl acetate powder, polyarylate powder, silicone rubber, polypropylene powder, polyester powder, polycarbonate powder, copolymers of polycarbonate with acrylonitrile butadiene styrene, copolymers of polycarbonate with polyethylene terephthalate, polyether ketone powder, polyacrylate powder, polystyrene powder, or mixtures thereof. In a specific example, the polymer powder can be polyamide 12, which can have a melting point from about 175° C. to about 200° C. In another specific example, the polymer powder can be thermoplastic polyurethane.

The thermoplastic polymer particles can also in some cases be blended with a filler. The filler can include inorganic particles such as alumina, silica, fibers, carbon nanotubes, or combinations thereof. When the thermoplastic polymer particles fuse together, the filler particles can become embedded in the polymer, forming a composite material. In some examples, the filler can include a free-flow agent, anti-caking agent, or the like. Such agents can prevent packing of the powder particles, coat the powder particles and smooth edges to reduce inter-particle friction, and/or absorb moisture. In some examples, a weight ratio of thermoplastic polymer particles to filler particles can be from about 100:1 to about 1:2 or from about 5:1 to about 1:1.

Fusing Agents

The multi-fluid kits and three-dimensional printing kits described herein can include a fusing agent to be applied to the polymer build material. The fusing agent can include a radiation absorber that can absorb radiant energy and convert the energy to heat. In certain examples, the fusing agent can be used with a powder bed material in a particular 3D printing process. A thin layer of powder bed material can be formed, and then the fusing agent can be selectively applied to areas of the powder bed material that are desired to be consolidated to become part of the solid 3D printed object. The fusing agent can be applied, for example, by printing such as with a fluid ejector or fluid jet printhead. Fluid jet printheads can jet the fusing agent in a similar way to an inkjet printhead jetting ink. Accordingly, the fusing agent can be applied with great precision to certain areas of the powder bed material that are desired to form a layer of the final 3D printed object. After applying the fusing agent, the powder bed material can be irradiated with radiant energy. The radiation absorber from the fusing agent can absorb this energy and convert it to heat, thereby heating any polymer particles in contact with the radiation absorber. An appropriate amount of radiant energy can be applied so that the area of the powder bed material that was printed with the fusing agent heats up enough to melt the polymer particles to consolidate the particles into a solid layer, while the powder bed material that was not printed with the fusing agent remains as a loose powder with separate particles.

In some examples, the amount of radiant energy applied, the amount fusing agent applied to the powder bed, the concentration of radiation absorber in the fusing agent, and the preheating temperature of the powder bed (i.e., the temperature of the powder bed material prior to printing the fusing agent and irradiating) can be tuned to ensure that the portions of the powder bed printed with the fusing agent will be fused to form a solid layer and the unprinted portions of the powder bed will remain a loose powder. These variables can be referred to as parts of the "print mode" of the 3D printing system. Generally, the print mode can include any variables or parameters that can be controlled during 3D printing to affect the outcome of the 3D printing process.

Generally, the process of forming a single layer by applying fusing agent and irradiating the powder bed can be repeated with additional layers of fresh powder bed material to form additional layers of the 3D printed article, thereby building up the final object one layer at a time. In this process, the powder bed material surrounding the 3D printed article can act as a support material for the object. When the 3D printing is complete, the article can be removed from the powder bed and any loose powder on the article can be removed.

Accordingly, in some examples, the fusing agent can include a radiation absorber that is capable of absorbing electromagnetic radiation to produce heat. The radiation absorber can be colored or colorless. In various examples, the radiation absorber can be a pigment such as carbon black pigment, glass fiber, titanium dioxide, clay, mica, talc, barium sulfate, calcium carbonate, a near-infrared absorbing dye, a near-infrared absorbing pigment, a conjugated polymer, a dispersant, or combinations thereof. Examples of near-infrared absorbing dyes include aminium dyes, tetraaryldiamine dyes, cyanine dyes, pthalocyanine dyes, dithiolene dyes, and others. In further examples, radiation absorber can be a near-infrared absorbing conjugated polymer such as poly(3,4-ethylenedioxythiophene)-poly(styrenesulfonate) (PEDOT:PSS), a polythiophene, poly(p-phenylene sulfide), a polyaniline, a poly(pyrrole), a poly (acetylene), poly(p-phenylene vinylene), polyparaphenylene, or combinations thereof. As used herein, "conjugated" refers to alternating double and single bonds between atoms in a molecule. Thus, "conjugated polymer" refers to a polymer that has a backbone with alternating double and single bonds. In many cases, the radiation absorber can have a peak absorption wavelength in the range of about 800 nm to about 1400 nm.

A variety of near-infrared pigments can also be used. Non-limiting examples can include phosphates having a variety of counterions such as copper, zinc, iron, magnesium, calcium, strontium, the like, and combinations thereof. Non-limiting specific examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. It is noted that the phosphates described herein are not limited to counterions having a +2 oxidation state. Other phosphate counterions can also be used to prepare other suitable near-infrared pigments.

Additional near-infrared pigments can include silicates. Silicates can have the same or similar counterions as phosphates. One non-limiting example can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the silicates described herein are not limited to counterions having a +2 oxidation state. Other silicate counterions can also be used to prepare other suitable near-infrared pigments.

In further examples, the radiation absorber can include a metal dithiolene complex. Transition metal dithiolene complexes can exhibit a strong absorption band in the 600 nm to 1600 nm region of the electromagnetic spectrum. In some examples, the central metal atom can be any metal that can form square planer complexes. Non-limiting specific examples include complexes based on nickel, palladium, and platinum.

A dispersant can be included in the fusing agent in some examples. Dispersants can help disperse the radiation absorbing pigments described above. In some examples, the dispersant itself can also absorb radiation. Non-limiting examples of dispersants that can be included as a radiation absorber, either alone or together with a pigment, can include polyoxyethylene glycol octylphenol ethers, ethoxylated aliphatic alcohols, carboxylic esters, polyethylene glycol ester, anhydrosorbitol ester, carboxylic amide, polyoxyethylene fatty acid amide, poly(ethylene glycol) p-isooctylphenyl ether, sodium polyacrylate, and combinations thereof.

The amount of radiation absorber in the fusing agent can vary depending on the type of radiation absorber. In some examples, the concentration of radiation absorber in the fusing agent can be from about 0.1 wt % to about 20 wt %. In one example, the concentration of radiation absorber in the fusing agent can be from about 0.1 wt % to about 15 wt %. In another example, the concentration can be from about 0.1 wt % to about 8 wt %. In yet another example, the concentration can be from about 0.5 wt % to about 2 wt %. In a particular example, the concentration can be from about 0.5 wt % to about 1.2 wt %. In one example, the radiation absorber can have a concentration in the fusing agent such that after the fusing agent is jetted onto the polymer powder, the amount of radiation absorber in the polymer powder can be from about 0.0003 wt % to about 10 wt %, or from about 0.005 wt % to about 5 wt %, with respect to the weight of the polymer powder.

In some examples, the fusing agent can be jetted onto the polymer powder build material using a fluid jetting device, such as inkjet printing architecture. Accordingly, in some examples, the fusing agent can be formulated to give the fusing agent good jetting performance. Ingredients that can be included in the fusing agent to provide good jetting performance can include a liquid vehicle. Thermal jetting can function by heating the fusing agent to form a vapor bubble that displaces fluid around the bubble, and thereby forces a droplet of fluid out of a jet nozzle. Thus, in some examples the liquid vehicle can include a sufficient amount of an evaporating liquid that can form vapor bubbles when heated. The evaporating liquid can be a solvent such as water, an alcohol, an ether, or a combination thereof.

In some examples, the liquid vehicle formulation can include a co-solvent or co-solvents present in total at from about 1 wt % to about 50 wt %, depending on the jetting architecture. Further, a non-ionic, cationic, and/or anionic surfactant can be present, ranging from about 0.01 wt % to about 5 wt %. In one example, the surfactant can be present in an amount from about 1 wt % to about 5 wt %. The liquid vehicle can include dispersants in an amount from about 0.5 wt % to about 3 wt %. The balance of the formulation can be purified water, and/or other vehicle components such as biocides, viscosity modifiers, materials for pH adjustment, sequestering agents, preservatives, and the like. In one example, the liquid vehicle can be predominantly water.

In some examples, a water-dispersible or water-soluble radiation absorber can be used with an aqueous vehicle. Because the radiation absorber is dispersible or soluble in water, an organic co-solvent may not be present, as it may not be included to solubilize the radiation absorber. Therefore, in some examples the fluids can be substantially free of organic solvent, e.g., predominantly water. However, in other examples a co-solvent can be used to help disperse other dyes or pigments, or enhance the jetting properties of the respective fluids. In still further examples, a non-aqueous vehicle can be used with an organic-soluble or organic-dispersible fusing agent.

Classes of co-solvents that can be used can include organic co-solvents including aliphatic alcohols, aromatic alcohols, diols, glycol ethers, polyglycol ethers, caprolactams, formamides, acetamides, and long chain alcohols. Examples of such compounds include 1-aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like. Specific examples of solvents that can be used include, but are not limited to, 2-pyrrolidinone, N-methylpyrrolidone, 2-hydroxyethyl-2-pyrrolidone, 2-methyl-1,3-propanediol, tetraethylene glycol, 1,6-hexanediol, 1,5-hexanediol and 1,5-pentanediol.

Regarding the surfactant that may be present, a surfactant or surfactants can be used, such as alkyl polyethylene oxides, alkyl phenyl polyethylene oxides, polyethylene oxide block copolymers, acetylenic polyethylene oxides, polyethylene oxide (di) esters, polyethylene oxide amines, protonated polyethylene oxide amines, protonated polyethylene oxide amides, dimethicone copolyols, substituted amine oxides, and the like. The amount of surfactant added to the fusing agent may range from about 0.01 wt % to about 20 wt %. Suitable surfactants can include, but are not limited to, liponic esters such as Tergitol™ 15-S-12, Tergitol™ 15-S-7 available from Dow Chemical Company (Michigan), LEG-1 and LEG-7; Triton™ X-100; Triton™ X-405 available from Dow Chemical Company (Michigan); and sodium dodecylsulfate.

Various other additives can be employed to enhance certain properties of the fusing agent for specific applications. Examples of these additives are those added to inhibit the growth of harmful microorganisms. These additives may be biocides, fungicides, and other microbial agents, which can be used in various formulations. Examples of suitable microbial agents include, but are not limited to, NUOSEPT® (Nudex, Inc., New Jersey), UCARCIDE™ (Union carbide Corp., Texas), VANCIDE® (R.T. Vanderbilt Co., Connecticut), PROXEL® (ICI Americas, New Jersey), and combinations thereof.

Sequestering agents, such as EDTA (ethylene diamine tetra acetic acid), may be included to eliminate the deleterious effects of heavy metal impurities, and buffer solutions may be used to control the pH of the fluid. From about 0.01 wt % to about 2 wt %, for example, can be used. Viscosity modifiers and buffers may also be present, as well as other additives to modify properties of the fluid as desired. Such additives can be present at from about 0.01 wt % to about 20 wt %.

As mentioned above, in some examples, the fusing agent can include a water-soluble or water-dispersible dihydrazide antioxidant. In certain examples, the fusing agent can include the dihydrazide antioxidant in an amount from about 0.1 wt % to about 10 wt %. In further examples, the fusing agent can include from about 5 wt % to about 40 wt % organic co-solvent, from about 0 wt % to about 20 wt % high boiling point solvent, from about 0.1 wt % to about 1 wt % surfactant, from about 0.1 wt % to about 1 wt % anti-kogation agent, from about 0.01 wt % to about 1 wt % chelating agent, from about 0.01 wt % to about 1 wt % biocide, and from about 1 wt % to about 10 wt % carbon black pigment. The balance can be deionized water.

Antioxidant Agents

In some examples, the multi-fluid kits or three-dimensional printing kits can include an antioxidant agent. Generally, the antioxidant agent can be a fluid agent that includes a water-soluble or water-dispersible dihydrazide antioxidant. In some examples, the antioxidant agent may not perform the functions of either a fusing agent or a detailing agent. In further examples, the antioxidant agent can be included in a multi-fluid kit or a three-dimensional 20) printing kit in which the other fluid agents do not include the dihydrazide antioxidant. In some examples, the antioxidant agent can include a dihydrazide antioxidant in an amount from about 0.1 wt % to about 10 wt % with respect to the total weight of the antioxidant agent. In further examples, the amount of the dihydrazide antioxidant can be from about 1 wt % to about 6 wt %.

The antioxidant agent can also include ingredients to allow the antioxidant agent to be jetted by a fluid jet printhead. In some examples, the antioxidant agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above Detailing Agents In further examples, multi-fluid kits or three-dimensional printing kits can include a detailing agent. The detailing agent can include a detailing compound. The detailing compound can be capable of reducing the temperature of the powder bed material onto which the detailing agent is applied. In some examples, the detailing agent can be printed around the edges of the portion of the powder that is printed with the fusing agent. The detailing agent can increase selectivity between the fused and unfused portions of the powder bed by reducing the temperature of the powder around the edges of the portion to be fused.

In some examples, the detailing compound can be a solvent that evaporates at the temperature of the powder bed. In some cases the powder bed can be preheated to a preheat temperature within about 10° C. to about 70° C. of the fusing temperature of the polymer powder. Depending on the type of polymer powder used, the preheat temperature can be in the range of about 90° C. to about 200° C. or more. The detailing compound can be a solvent that evaporates when it comes into contact with the powder bed at the preheat temperature, thereby cooling the printed portion of the powder bed through evaporative cooling. In certain examples, the detailing agent can include water, co-solvents, or combinations thereof. Non-limiting examples of co-solvents for use in the detailing agent can include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-Methoxy-3-Methyl-1-butanol, isobutyl alcohol, 1,4-butanediol, N, N-dimethyl acetamide, and combinations thereof. In some examples, the detailing agent can be mostly water. In a particular example, the detailing agent can be about 85 wt % water or more. In further examples, the detailing agent can be about 95 wt % water or more. In still further examples, the detailing agent can be substantially devoid of radiation absorbers. That is, in some examples, the detailing agent can be substantially devoid of ingredients that absorb enough radiation energy to cause the powder to fuse. In certain examples, the detailing agent can include colorants such as dyes or pigments, but in small enough amounts that the colorants do not cause the powder printed with the detailing agent to fuse when exposed to the radiation energy.

The detailing agent can also include ingredients to allow the detailing agent to be jetted by a fluid jet printhead. In some examples, the detailing agent can include jettability imparting ingredients such as those in the fusing agent described above. These ingredients can include a liquid vehicle, surfactant, dispersant, co-solvent, biocides, viscosity modifiers, materials for pH adjustment, sequestering agents, preservatives, and so on. These ingredients can be included in any of the amounts described above.

In some examples, the detailing agent can include a water-soluble or water-dispersible dihydrazide antioxidant in an amount from about 0.1 wt % to about 10 wt % with respect to the total weight of the detailing agent. In further examples, the amount of the dihydrazide antioxidant can be from about 1 wt % to about 6 wt %. In still further examples, the detailing agent can include from about 1 wt % to about 10 wt % organic co-solvent, from about 1 wt % to about 20 wt % high boiling point solvent, from about 0.1 wt % to about 2 wt % surfactant, from about 0.1 wt % to about 5 wt % anti-kogation agent, from about 0.01 wt % to about 5 wt % chelating agent, from about 0.01 wt % to about 4 wt % biocide, and the balance can be deionized water.

Methods of Making 3D Printed Articles

Figure 7:
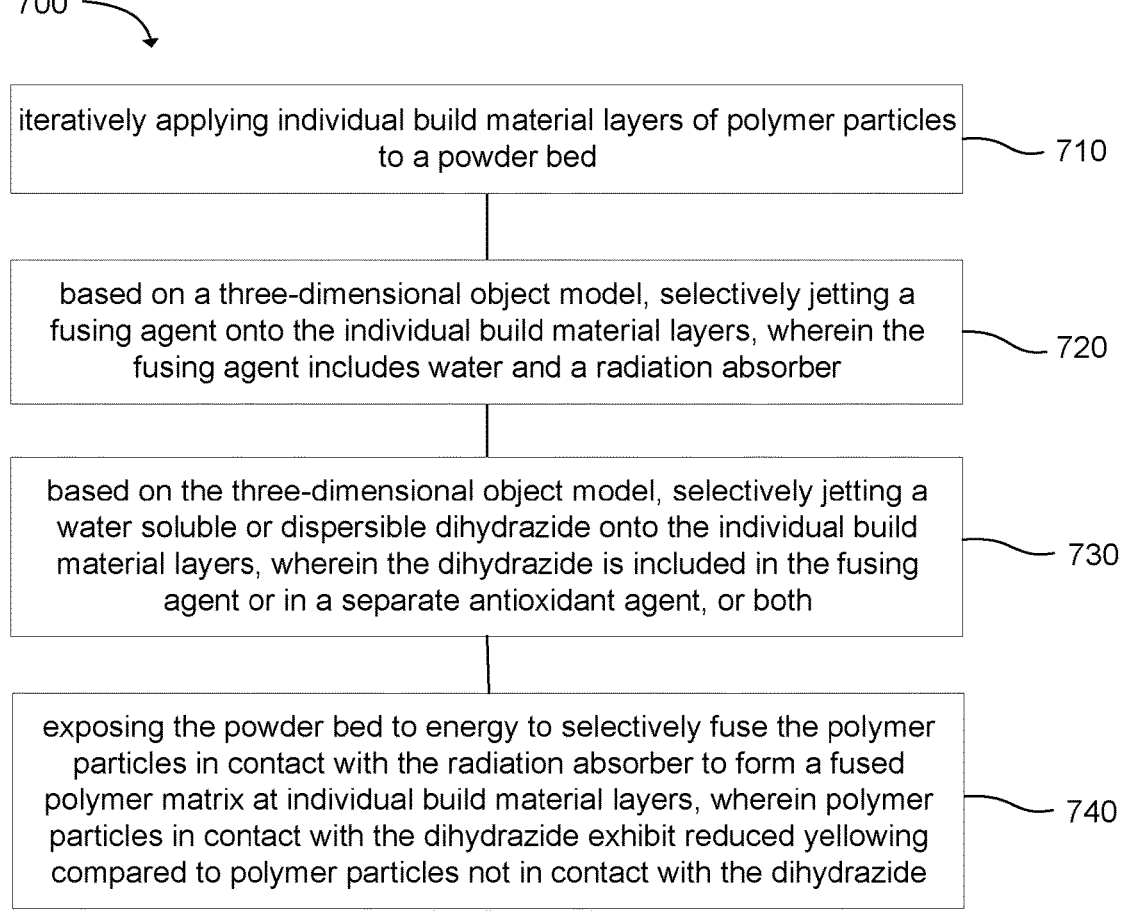
FIG. 7 is a flowchart illustrating an example method of making a three-dimensional printed article in accordance with examples of the present disclosure.

The present disclosure also describes methods of making three-dimensional printed articles. FIG. 7 shows a flowchart illustrating one example method 700 of making a three-dimensional printed article. The method includes: iteratively applying individual build material layers of polymer particles to a powder bed 710; based on a three-dimensional object model, selectively jetting a fusing agent onto the individual build material layers, wherein the fusing agent includes water and a radiation absorber 720; based on the three-dimensional object model, selectively jetting a water soluble or dispersible dihydrazide onto the individual build material layers, wherein the dihydrazide is included in the fusing agent or in a separate antioxidant agent, or both 730; and exposing the powder bed to energy to selectively fuse the polymer particles in contact with the radiation absorber to form a fused polymer matrix at individual build material layers, wherein polymer particles in contact with the dihydrazide exhibit reduced yellowing compared to polymer particles not in contact with the dihydrazide 740.

In some examples, the dihydrazide antioxidant can be selectively jetted on certain areas of the powder bed where reduced yellowing is desired. In one example, the dihydrazide antioxidant can be jetted on areas of the individual build material layers that form an exterior surface of the three-dimensional printed article. This can reduce yellowing of the polymer that is visible on the exterior surface of the three-dimensional printed article. In certain examples, the dihydrazide antioxidant may not be printed on areas of the build material layers that form the interior of the three-dimensional printed part. In another example, the dihydrazide antioxidant can be jetted on areas surrounding the edges of the three-dimensional printed article, where the polymer powder remains loose after printing the three-dimensional article. In some cases, the polymer powder near the areas that are fused can be exposed to higher temperatures than other areas of the powder bed. Therefore, in some examples the dihydrazide antioxidant can be selectively applied to these areas to reduce yellowing due to the higher temperatures.

In certain examples, the dihydrazide antioxidant can be included in a separate antioxidant agent that is also a detailing agent. The antioxidant agent can include a detailing compound that reduces a temperature of powder bed material onto which the antioxidant agent is applied.

In some examples, the dihydrazide antioxidant can be in either the fusing agent or a separate antioxidant agent, and an additional detailing agent can be jetted onto the powder bed. As described above, the detailing agent can be a fluid that reduces the maximum temperature of the polymer powder on which the detailing agent is printed. In particular, the maximum temperature reached by the powder during exposure to electromagnetic energy can be less in the areas where the detailing agent is applied. In certain examples, the detailing agent can include a solvent that evaporates from the polymer powder to evaporatively cool the polymer powder. The detailing agent can be printed in areas of the powder bed where fusing is not desired. In particular examples, the detailing agent can be printed along the edges of areas where the fusing agent is printed. This can give the fused layer a clean, defined edge where the fused polymer particles end and the adjacent polymer particles remain unfused. In other examples, the detailing agent can be printed in the same area where the fusing agent is printed to control the temperature of the area to be fused. In certain examples, some areas to be fused can tend to overheat, especially in central areas of large fused sections. To control the temperature and avoid overheating (which can lead to melting and slumping of the build material), the detailing agent can be applied to these areas.

The fusing agent, antioxidant agent, and detailing agent can be jetted onto the powder bed using fluid jet print heads. The amount of the fusing agent used can be calibrated based on the concentration of radiation absorber in the fusing agent, the level of fusing desired for the polymer particles, and other factors. In some examples, the amount of fusing agent printed can be sufficient to contact the radiation absorber with the entire layer of polymer powder. For example, if individual layers of polymer powder are 100 microns thick, then the fusing agent can penetrate 100 microns into the polymer powder. Thus the fusing agent can heat the polymer powder throughout the entire layer so that the layer can coalesce and bond to the layer below. After forming a solid layer, a new layer of loose powder can be formed, either by lowering the powder bed or by raising the height of a powder roller and rolling a new layer of powder.

In some examples, the entire powder bed can be preheated to a temperature below the melting or softening point of the polymer powder. In one example, the preheat temperature can be from about 10° C. to about 30° C. below the melting or softening point. In another example, the preheat temperature can be within 50° C. of the melting of softening point. In a particular example, the preheat temperature can be from about 160° C. to about 170° C. and the polymer powder can be polyamide 12 powder. In another example, the preheat temperature can be about 90° C. to about 100° C. and the polymer powder can be thermoplastic polyurethane. Preheating can be accomplished with a lamp or lamps, an oven, a heated support bed, or other types of heaters. In some examples, the entire powder bed can be heated to a substantially uniform temperature.

The powder bed can be irradiated with a fusing lamp. Suitable fusing lamps for use in the methods described herein can include commercially available infrared lamps and halogen lamps. The fusing lamp can be a stationary lamp or a moving lamp. For example, the lamp can be mounted on a track to move horizontally across the powder bed. Such a fusing lamp can make multiple passes over the bed depending on the amount of exposure to coalesce individual printed layers. The fusing lamp can be configured to irradiate the entire powder bed with a substantially uniform amount of energy. This can selectively coalesce the printed portions with fusing agent leaving the unprinted portions of the polymer powder below the melting or softening point.

In one example, the fusing lamp can be matched with the radiation absorber in the fusing agent so that the fusing lamp emits wavelengths of light that match the peak absorption wavelengths of the radiation absorber. A radiation absorber with a narrow peak at a particular near-infrared wavelength can be used with a fusing lamp that emits a narrow range of wavelengths at approximately the peak wavelength of the radiation absorber. Similarly, a radiation absorber that absorbs a broad range of near-infrared wavelengths can be used with a fusing lamp that emits a broad range of wavelengths. Matching the radiation absorber and the fusing lamp in this way can increase the efficiency of coalescing the polymer particles with the fusing agent printed thereon, while the unprinted polymer particles do not absorb as much light and remain at a lower temperature.

Depending on the amount of radiation absorber present in the polymer powder, the absorbance of the radiation absorber, the preheat temperature, and the melting or softening point of the polymer, an appropriate amount of irradiation can be supplied from the fusing lamp. In some examples, the fusing lamp can irradiate individual layers from about 0.5 to about 10 seconds per pass The 3D printed article can be formed by jetting a fusing agent onto layers of powder bed build material according to a 3D object model. 3D object models can in some examples be created using computer aided design (CAD) software. 3D object models can be stored in any suitable file format. In some examples, a 3D printed article as described herein can be based on a single 3D object model. The 3D object model can define the three-dimensional shape of the article. In some cases, an antioxidant agent can be added to portions of the 3D printed article, such as portions near the surface where yellowing would be visible. In such examples, the 3D object model may include both the three-dimensional shape of the article and also the three-dimensional shape of the portion of the article where the antioxidant agent is to be added. In other examples, the article can be defined by a first 3D object model and the antioxidant agent portions can be defined by a second 3D object model. Other information may also be included, such as structures to be formed of additional different materials or color data for printing the article with various colors at different locations on the article. The 3D object model may also include features or materials specifically related to jetting fluids on layers of powder bed material, such as the desired amount of fluid to be applied to a given area. This information may be in the form of a droplet saturation, for example, which can instruct a 3D printing system to jet a certain number of droplets of fluid into a specific area. This can allow the 3D printing system to finely control radiation absorption, cooling, color saturation, concentration of the dihydrazide antioxidant, and so on. All this information can be contained in a single 3D object file or a combination of multiple files. The 3D printed article can be made based on the 3D object model. As used herein, "based on the 3D object model" can refer to printing using a single 3D object model file or a combination of multiple 3D object models that together define the article. In certain examples, software can be used to convert a 3D object model to instructions for a 3D printer to form the article by building up individual layers of build material.

In an example of the 3D printing process, a thin layer of polymer powder can be spread on a bed to form a powder bed. At the beginning of the process, the powder bed can be empty because no polymer particles have been spread at that point. For the first layer, the polymer particles can be spread onto an empty build platform. The build platform can be a flat surface made of a material sufficient to withstand the heating conditions of the 3D printing process, such as a metal. Thus, "applying individual build material layers of polymer particles to a powder bed" includes spreading polymer particles onto the empty build platform for the first layer. In other examples, a number of initial layers of polymer powder can be spread before the printing begins. These "blank" layers of powder bed material can in some examples number from about 10 to about 500, from about 10 to about 200, or from about 10 to about 100. In some cases, spreading multiple layers of powder before beginning the print can increase temperature uniformity of the 3D printed article. A fluid jet printing head, such as an inkjet print head, can then be used to print a fusing agent including a radiation absorber over portions of the powder bed corresponding to a thin layer of the 3D article to be formed. Then the bed can be exposed to electromagnetic energy, e.g., typically the entire bed. The electromagnetic energy can include light, infrared radiation, and so on. The radiation absorber can absorb more energy from the electromagnetic energy than the unprinted powder. The absorbed light energy can be converted to thermal energy, causing the printed portions of the powder to soften and fuse together into a formed layer. After the first layer is formed, a new thin layer of polymer powder can be spread over the powder bed and the process can be repeated to form additional layers until a complete 3D article is printed. Thus, "applying individual build material layers of polymer particles to a powder bed" also includes spreading layers of polymer particles over the loose particles and fused layers beneath the new layer of polymer particles.

Definitions

It is noted that, as used in this specification and the appended claims, the singular forms "a," "an," and "the" include plural referents unless the context clearly dictates otherwise.

As used herein, "colorant" can include dyes and/or pigments.

As used herein, "dye" refers to compounds or molecules that absorb electromagnetic radiation or certain wavelengths thereof. Dyes can impart a visible color to an ink if the dyes absorb wavelengths in the visible spectrum.

As used herein, "pigment" generally includes pigment colorants, magnetic particles, aluminas, silicas, and/or other ceramics, organo-metallics or other opaque particles, whether or not such particulates impart color. Thus, though the present description primarily exemplifies the use of pigment colorants, the term "pigment" can be used more generally to describe pigment colorants, and also other pigments such as organometallics, ferrites, ceramics, etc. In one specific aspect, however, the pigment is a pigment colorant.

As used herein, "ink jetting" or "jetting" refers to compositions that are ejected from jetting architecture, such as ink-jet architecture. Ink-jet architecture can include thermal or piezo architecture. Additionally, such architecture can be configured to print varying drop sizes such as less than 10 picoliters, less than 20 picoliters, less than 30 picoliters, less than 40 picoliters, less than 50 picoliters, etc.

As used herein, "average particle size" refers to a number average of the diameter of the particles for spherical particles, or a number average of the volume equivalent sphere diameter for non-spherical particles. The volume equivalent sphere diameter is the diameter of a sphere having the same volume as the particle. Average particle size can be measured using a particle analyzer such as the Mastersizer™ 3000 available from Malvern Panalytical. The particle analyzer can measure particle size using laser diffraction. A laser beam can pass through a sample of particles and the angular variation in intensity of light scattered by the particles can be measured. Larger particles scatter light at smaller angles, while small particles scatter light at larger angles. The particle analyzer can then analyze the angular scattering data to calculate the size of the particles using the Mie theory of light scattering. The particle size can be reported as a volume equivalent sphere diameter.

As used herein, the term "substantial" or "substantially" when used in reference to a quantity or amount of a material, or a specific characteristic thereof, refers to an amount that is sufficient to provide an effect that the material or characteristic was intended to provide. The exact degree of deviation allowable may in some cases depend on the specific context. When using the term "substantial" or "substantially" in the negative, e.g., substantially devoid of a material, what is meant is from none of that material is present, or at most, trace amounts could be present at a concentration that would not impact the function or properties of the composition as a whole.

As used herein, the term "about" is used to provide flexibility to a numerical range endpoint by providing that a given value may be "a little above" or "a little below" the endpoint. The degree of flexibility of this term can be dictated by the particular variable and determined based on the associated description herein.

As used herein, a plurality of items, structural elements, compositional elements, and/or materials may be presented in a common list for convenience. However, these lists should be construed as though individual members of the list are identified as a separate and unique members. Thus, no individual member of such list should be construed as a de facto equivalent of any other member of the same list solely based on their presentation in a common group without indications to the contrary.

Concentrations, amounts, and other numerical data may be expressed or presented herein in a range format. It is to be understood that such a range format is used merely for convenience and brevity and thus should be interpreted flexibly to include the numerical values explicitly recited as the limits of the range, and also to include individual numerical values or sub-ranges encompassed within that range as if numerical values and sub-ranges are explicitly recited. As an illustration, a numerical range of "about 1 wt % to about 5 wt %" should be interpreted to include the explicitly recited values of about 1 wt % to about 5 wt %, and also include individual values and sub-ranges within the indicated range. Thus, included in this numerical range are individual values such as 2, 3.5, and 4 and sub-ranges such as from 1-3, from 2-4, and from 3-5, etc. This same principle applies to ranges reciting a single numerical value. Furthermore, such an interpretation should apply regardless of the breadth of the range or the characteristics being described.

EXAMPLES

The following illustrates examples of the present disclosure. However, it is to be understood that the following are merely illustrative of the application of the principles of the present disclosure. Numerous modifications and alternative devices, methods, and systems may be devised without departing from the spirit and scope of the present disclosure. The appended claims are intended to cover such modifications and arrangements.

To test the jettability and efficacy of a water-soluble dihydrazide, adipic dihydrazide was selected for experimental testing. First, a series of fusing agent samples were prepared by adding adipic dihydrazide in a series of concentrations from 0.1 to 2 wt % to a fusing agent for 3D printing. The fusing agents included the following other ingredients besides the adipic dihydrazide, as shown in Table 1.

TABLE 1

| Ingredient | Concentration (wt %) |
| --- | --- |
| Organic Co-solvent | 5-40 |
| High Boiling Point Solvent | 0-20 |
| Surfactant | 0.1-1 |
| Anti-kogation Agent | 0.1-1 |
| Chelating Agent | 0.01-1 |
| Biocide | 0.01-1 |
| Carbon Black Pigment | 1-10 |
| Deionized Water | balance |

A series of samples were also prepared based on a detailing agent. The detailing agent samples included concentrations of adipic dihydrazide from 0.1 wt % to 1.3 wt %. The detailing agent included the ingredients shown in Table 2 in addition to the adipic dihydrazide.

TABLE 2

| Ingredient | Concentration (wt %) |
| --- | --- |
| Organic Co-solvent | 1-10 |
| High Boiling Point Solvent | 1-20 |
| Surfactant | 0.1-2 |
| Anti-kogation Agent | 0.1-5 |
| Chelating Agent | 0.01-5 |
| Biocide | 0.01-4 |
| Deionized Water | balance |

The fusing agent and detailing agent samples was prepared by mixing adipic dihydrazide with the fusing agent or detailing agent. The adipic dihydrazide appeared to go into solution in the various samples after several minutes of gently stirring. This indicates that the adipic dihydrazide was easily soluble in water.

The jettability of the fusing agent and detailing agent samples was then tested. The samples were loaded into a test inkjet printer. The fusing agent samples and detailing agent samples were then printed on normal paper using 2D inkjet printing. The fusing agent samples included carbon black pigment as a radiation absorber, which imparted a visible black color to the fusing agent samples. The detailing agent samples did not include any visible colorants, so a small amount of red dye was added to the detailing agent samples in order to view the printing quality of the detailing agent samples. A test page was printed with the various samples, including a combination of narrow lines and solid rectangles. The various samples were printed with good quality. No evidence of increased nozzle clogging or other jetting issues were observed when the adipic dihydrazide was added to the samples.

The performance of fluid agents including adipic dihydrazide was then tested in a 3D printing process. A detailing agent was formulated with 1.2 wt % adipic dihydrazide. This detailing agent was loaded into a test 3D printer based on the HP Multi Jet Fusion 3D® printer. A fusing agent that did not contain any adipic dihydrazide was also loaded in the 3D printer. The build material was a polyamide 12 powder with 3 wt % titanium dioxide. The fusing agent was used to print three hollow cubes having walls of fused polymer and an interior volume filled with loose polymer powder. In the first cube, no detailing agent was jetted onto the loose polymer powder. In the second cube, a control detailing agent containing no adipic dihydrazide was jetted onto the loose powder. In the third cube, the sample detailing agent with 1.2 wt % adipic dihydrazide was jetted onto the loose powder. The amount of detailing agent jetted onto the powder was such that the amount of adipic anhydride in the loose powder was approximately 0.5 wt % based on the weight of the polymer powder. This entire print job is designated "print job A." Print job A was repeated at a different location in the powder bed to control for spatial variations in different parts of the powder bed. This print job is designated "print job B."

After printing, the powder from inside the various cubes was aged at 175° C. for 72 hours. The whiteness of the powder samples were measured, as represented by the value $L^*$. The $L^*$ value was measured using an eXact™ spectrophotometer from X-Rite, Inc. (Michigan). The spectrophotometer expresses color as three values: $L^*$, $a^*$, and $b^*$). $L^*$ is the measure for lightness ranging from black at $L^*=0$ to white at $L^*=100$. The powders from print job A/print job B had the following $L^*$ values, respectively: The powder having no detailing agent had $L^*$ values of 71.49/66.30 for print jobs A/B; the powder having detailing agent without adipic dihydrazide had $L^*$ values of 65.61/61.71 for print jobs A/B; and the powder having detailing agent with adipic dihydrazide had $L^*$ values of 78.70/69.19 for print jobs A/B. These results show that the whiteness of the pure powder consistently decreased when the normal detailing agent was added, but when the detailing agent containing adipic dihydrazide was used, the whiteness increased to a level higher than for the original pure powder. This shows that the adipic dihydrazide can effectively reduce yellowing of the powder when aged at a high temperature.

The solution viscosity was measured for the powders treated with normal detailing agent and adipic dihydrazide-containing detailing agent, before and after aging. The powders treated with normal detailing agent had a solution viscosity of 1.945/1.946 before aging (for powders from print jobs A/B, respectively). After aging, the solution viscosities were 1.606/1.594. For the powders treated with adipic dihydrazide-containing detailing agent, the solution viscosities before aging were 1.873/1.883 and the solution viscosities after aging were 1.820/1.794. The solution viscosity of the powders treated with adipic dihydrazide-containing detailing agent decreased after aging for the various samples, indicating that the polymer was degrading due to the aging. However, the powders treated with the adipic dihydrazide-containing detailing agent showed a much smaller decrease in solution viscosity, indicating that the adipic dihydrazide reduced the amount of degradation.

Print jobs A and B were then repeated using a different polyamide 12 powder that had been found to be more prone to yellowing and browning. The same results were obtained. Specifically, the powder samples had a noticeable brown color after aging. However, the powder treated with the adipic dihydrazide-containing detailing agent was noticeably less brown. Samples were aged at two different temperatures: 165° C. for 20 hours and 175° C. for 20 hours. Colorimetric measurements were then taken to measure $b^*$ and $L^*$ values for the various samples. As mentioned above, the measurements were taken using an eXact™ spectrophotometer from X-Rite, Inc. (Michigan). The value $L^*$ is the lightness as explained above, and the value $b^*$ is a measure of color ranging from blue (negative values) to yellow (positive values). Higher $b^*$ values indicate more yellowing. The samples included powders that were not treated with any detailing agent from print jobs A and B, powders treated with normal detailing agent from print jobs A and B, and powders treated with adipic dihydrazide-containing detailing agent from print jobs A and B.

The test results from the repeat of print jobs A and B are shown in Table 3.

19

TABLE 3

| Print Job | Treat-ment | b* No Aging | b* 165° C. | b* 175° C. | L* No Aging | L* 165° C. | L* 175° C. |
|---|---|---|---|---|---|---|---|
| A | None | 1.51 | 3.67 | 9.53 | 97.81 | 93.01 | 75.82 |
| B | None | 1.48 | 3.04 | 7.83 | 97.32 | 95.21 | 83.93 |
| A | Normal Detailing | 1.63 | 7.71 | 13.68 | 88.38 | 94.23 | 77.70 |
| B | Normal Detailing | 1.49 | 8.05 | 13.01 | 90.96 | 94.48 | 77.78 |
| A | ADH Detailing | 1.50 | 5.55 | 8.35 | 90.44 | 92.07 | 79.85 |
| B | ADH Detailing | 1.29 | 5.45 | 8.37 | 96.07 | 95.20 | 80.74 |

In these tests, the b* value was reduced for all samples when the powder was treated with adipic dihydrazide-containing detailing agent compared to the normal detailing agent. This indicates reduced browning for all samples. The L* value was increased for all but one of the samples, indicating that the adipic dihydrazide-containing detailing agent tended to increase the whiteness of the powder.

What is claimed is:

1. A multi-fluid kit for three-dimensional printing, the multi-fluid kit comprising:
a fusing agent comprising water and a radiation absorber, wherein the radiation absorber absorbs radiation energy and converts the radiation energy to heat; and
another agent,
wherein the fusing agent, the other agent, or both includes a water-soluble or water-dispersible dihydrazide antioxidant,
and wherein:
i) the water-soluble or water-dispersible dihydrazide antioxidant is present in the fusing agent in an amount ranging from about 0.1 wt % to about 10 wt % with respect to a total weight of the fusing agent; or
ii) the water-soluble or water-dispersible dihydrazide antioxidant is present in the other agent in an amount ranging from about 0.1 wt % to about 10 wt % with respect to a total weight of the other agent; or
iii) the water-soluble or water-dispersible dihydrazide antioxidant is present in the fusing agent in an amount ranging from about 0.1 wt % to about 10 wt % with respect to a total weight of the fusing agent and is present in the other agent in an amount ranging from about 0.1 wt % to about 10 wt % with respect to a total weight of the other agent.

2. The multi-fluid kit of claim 1, wherein the water-soluble or water-dispersible dihydrazide antioxidant is present in the fusing agent, and the other agent is a detailing agent comprising a detailing compound, wherein the detailing compound reduces a temperature of powder bed material onto which the detailing agent is applied.

3. The multi-fluid kit of claim 1, wherein the other agent is an antioxidant agent including water and the water-soluble or water-dispersible dihydrazide antioxidant.

4. The multi-fluid kit of claim 1, wherein the water-soluble or water-dispersible dihydrazide antioxidant is selected from the group consisting of adipic dihydrazide, carbohydrazide, oxalyl dihydrazide, succinic dihydrazide, isophthalic dihydrazide, azelaic dihydrazide, sebacic dihydrazide, dodecanedioic dihydrazide, terephthalic dihydrazide, oxybisbenzene sulfonylhydrazide, and a combination thereof.

5. The multi-fluid kit of claim 1, wherein the radiation absorber is a metal dithiolene complex, carbon black, a near-infrared absorbing dye, a near-infrared absorbing pigment, metal nanoparticles, a conjugated polymer, or a combination thereof.

6. The multi-fluid kit of claim 1, wherein the fusing agent is colorless.

7. A method of making a three-dimensional printed article, the method comprising:
iteratively applying individual build material layers of polymer particles to a powder bed;
based on a three-dimensional object model, selectively jetting a fusing agent onto the individual build material layers, wherein the fusing agent comprises water and a radiation absorber;
based on the three-dimensional object model, selectively jetting a water-soluble or water-dispersible dihydrazide antioxidant onto the individual build material layers, wherein the dihydrazide is included in the fusing agent, in another agent separate from the fusing agent, or in both, and wherein:
i) the water-soluble or water-dispersible dihydrazide antioxidant is present in the fusing agent in an amount ranging from about 0.1 wt % to about 10 wt % with respect to a total weight of the fusing agent; or
ii) the water-soluble or water-dispersible dihydrazide antioxidant is present in the other agent in an amount ranging from about 0.1 wt % to about 10 wt % with respect to a total weight of the other agent; or
iii) the water-soluble or water-dispersible dihydrazide antioxidant is present in the fusing agent in an amount ranging from about 0.1 wt % to about 10 wt % with respect to a total weight of the fusing agent and is present in the other agent in an amount ranging from about 0.1 wt % to about 10 wt % with respect to a total weight of the other agent; and
exposing the powder bed to energy to selectively fuse the polymer particles in contact with the radiation absorber to form a fused polymer matrix at individual build material layers, wherein polymer particles in contact with the water-soluble or water-dispersible dihydrazide antioxidant exhibit reduced yellowing compared to polymer particles not in contact with the water-soluble or water-dispersible dihydrazide antioxidant.

8. The method of claim 7, wherein the water-soluble or water-dispersible dihydrazide antioxidant is included in the other agent, and wherein the method further comprises selectively jetting, based on the three-dimensional object model, a detailing agent comprising a detailing compound that reduces a temperature of powder bed material onto which the detailing agent is applied.

9. The method of claim 7, wherein the water-soluble or water-dispersible dihydrazide antioxidant is selectively jetted on areas of the individual build material layers that form an exterior surface of the three-dimensional printed article, remain as loose polymer particles adjacent to a surface of the three-dimensional printed article, or both.

10. The multi-fluid kit of claim 1, wherein the fusing agent, the other agent, or both the fusing agent and the other agent further includes an organic co-solvent selected from the group consisting of aliphatic alcohols, aromatic alcohols, diols, glycol ethers, polyglycol ethers, caprolactams, formamides, acetamides, and long chain alcohols.

11. The multi-fluid kit of claim 1, wherein:
the water-soluble or water-dispersible dihydrazide antioxidant is included in the fusing agent in an amount ranging from 0.1 wt % to 2 wt %, with respect to the total weight of the fusing agent; or the water-soluble or water-dispersible dihydrazide antioxidant is included in the other agent in an amount ranging from 0.1 wt % to 1.3 wt %, with respect to the total weight of the other agent; or the water-soluble or water-dispersible dihydrazide antioxidant is included in the fusing agent in an amount ranging from 0.1 wt % to 2 wt %, with respect to the total weight of the fusing agent and the water-soluble or water-dispersible dihydrazide antioxidant is included in the other agent in an amount ranging from 0.1 wt % to 1.3 wt %, with respect to the total weight of the other agent.

* * * * *